United States Patent [19]

Sasaki et al.

[11] Patent Number: 5,577,118
[45] Date of Patent: Nov. 19, 1996

[54] TELEPHONE-TERMINAL COMBINATION WITH PLURAL KEYBOARDS

[75] Inventors: Jeffrey K. Sasaki, San Francisco; James S. Arakaki, Auburn, both of Calif.

[73] Assignee: Verifone, Inc., Redwood City, Calif.

[21] Appl. No.: 573,720

[22] Filed: Dec. 18, 1995

Related U.S. Application Data

[63] Continuation of Ser. No. 289,882, Aug. 12, 1994, abandoned.

[51] Int. Cl.⁶ .................................................. H04M 1/00
[52] U.S. Cl. ........................... 379/428; 379/429; 379/436
[58] Field of Search .................................. 379/428, 429, 379/435, 437, 436, 420, 433, 368, 96; 400/455; 341/22, 23

[56] References Cited

U.S. PATENT DOCUMENTS

| | | | |
|---|---|---|---|
| 4,381,500 | 4/1983 | Urata et al. ............................. | 379/368 |
| 4,533,791 | 8/1985 | Read et al. ............................. | 379/96 |
| 4,790,007 | 12/1988 | Richter et al. ........................ | 379/420 |

FOREIGN PATENT DOCUMENTS

| | | | |
|---|---|---|---|
| 4023547 | 1/1992 | Japan .................................. | 379/437 |

*Primary Examiner*—Krista M. Zele
*Assistant Examiner*—Jack Chiang
*Attorney, Agent, or Firm*—Lowell C. Bergstedt

[57] ABSTRACT

A microprocessor-based telephone having a housing, a lower key panel positioned within a top portion of the housing, and an upper key panel hingedly mounted to the housing to swing away and reveal the lower key panel. The lower key panel carries an alphanumeric keyboard thereon to enable a user to perform alphanumeric data entry. The upper key panel carries a telephone keypad to enable a user to dial telephone numbers.

15 Claims, 7 Drawing Sheets

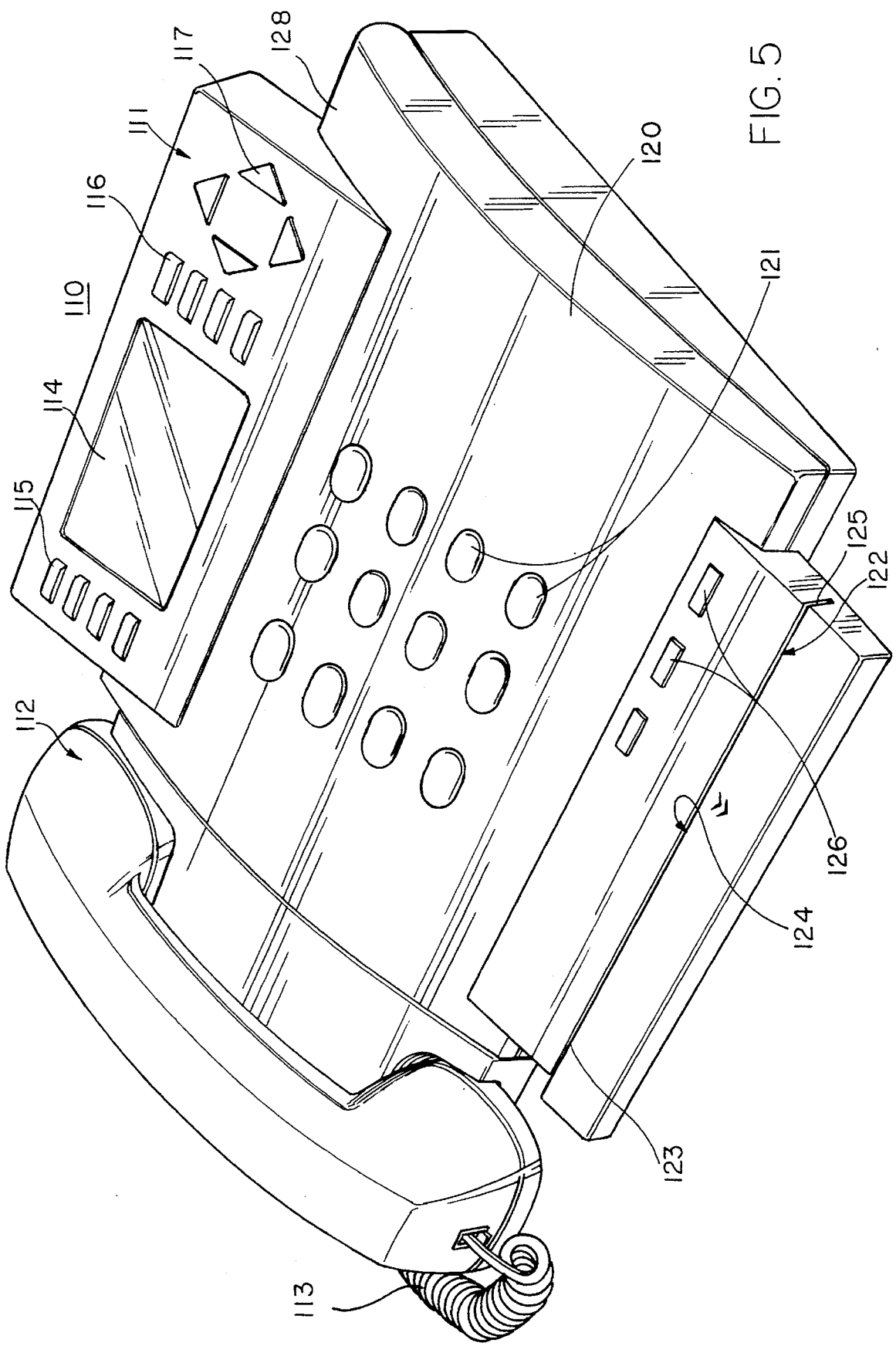

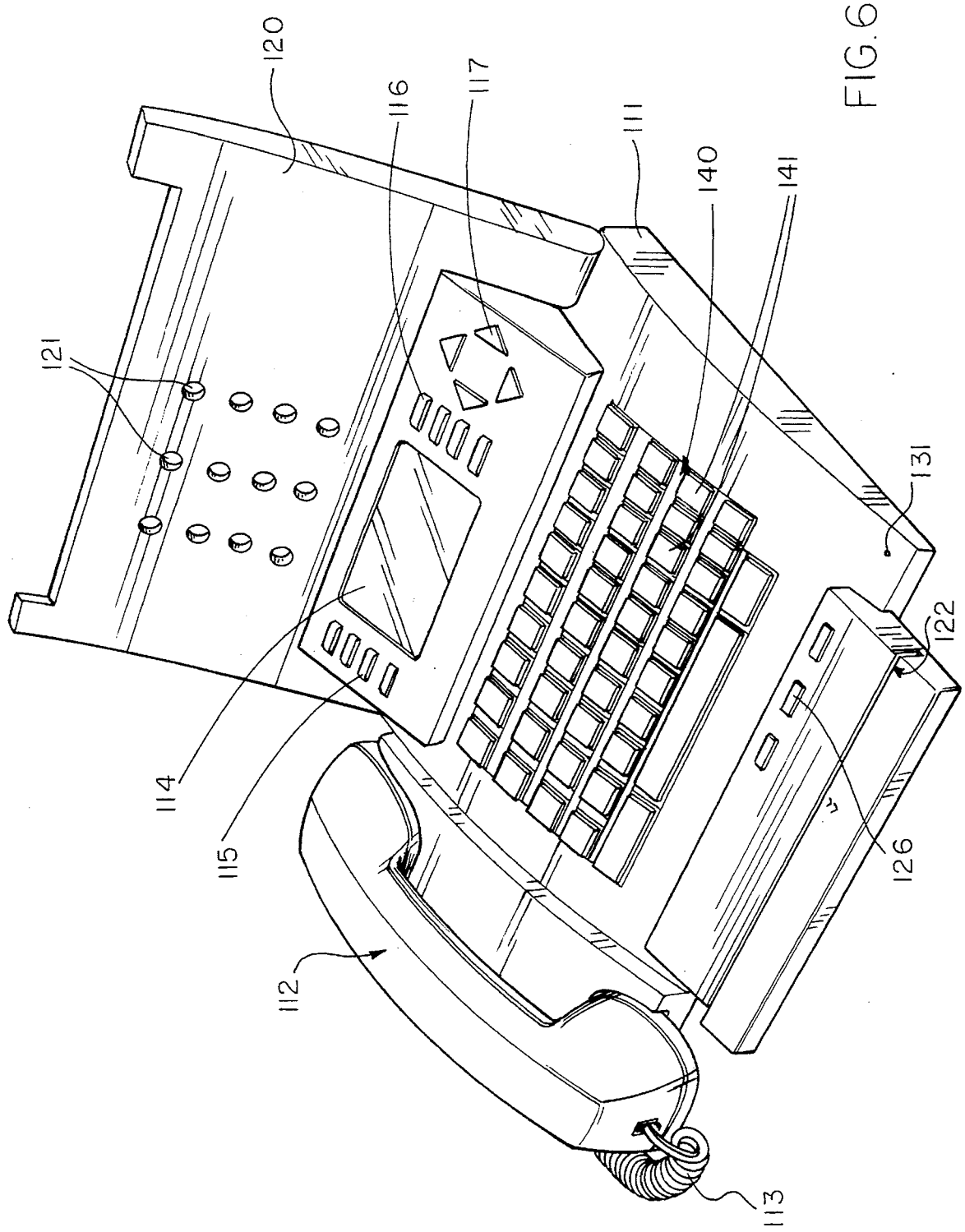

TELEPHONE-TERMINAL COMBINATION WITH PLURAL KEYBOARDS

This is a continuation of application Ser. No. 08/289,882, filed Aug. 12, 1994, now abandoned.

FIELD OF THE INVENTION

This invention relates generally to subscriber telephones and more specifically to subscriber telephones with special computer apparatus for implementing smart telephone functions. More specifically, this invention relates to subscriber telephones that combine a telephone keypad for telephone functions and an alphanumeric keyboard for computer functions.

BACKGROUND OF THE INVENTION

Subscriber telephone instruments have become increasingly sophisticated in features and functions over the past several decades. Simple rotary dial telephones with primitive electromechanical components were obsoleted by push button dial telephones with primitive analog circuit components. The primitive push button dial telephones were obsoleted by sophisticated electronic telephones that use programmed microprocessor technology to implement basic telephone functions and to offer advanced features such as speed dialing, directory dialing, telephone call logging, and additional sophisticated features. This technical progress is shown in the following U.S. Patents:

Lenaerts et al. U.S. Pat. No. 3,920,926 Title: "Telephone data set including visual display means"

Hoff et al. U.S. Pat. No. 3,932,709 TITLE: "ELECTRONIC BUSINESS TELEPHONE"

Warren U.S. Pat. No. 4,011,414 TITLE: "AUTOMATIC DIAL SYSTEM FOR A SUBSCRIBER TELEPHONE"

Mallien U.S. Pat. No. 4,122,304 TITLE: "CONTROL CIRCUITRY FOR A RADIO TELEPHONE"

The Warren and Mallien patents show the implementation of subscriber telephone features using programmed microprocessors.

Parallel with the development of microprocessor based smart telephones, point of sale terminals which incorporate microprocessor based telephone and data terminal features were being developed. Examples of such systems are described in the following U.S. Patents:

Borison et al. U.S. Pat. No. 3,983,090 TITLE: "TERMINAL APPARATUS"

Chang et al. U.S. Pat. Nos. 4,788,420 and 5,019,696 TITLE: "SYSTEM AND METHOD FOR READING . . . "

With cost-performance improvements in in microprocessor and memory systems it eventually became possible to integrate subscriber telephone and data terminal features into a single screen telephone instrument. Such sophisticated screen telephones include alphanumeric keyboards in addition to telephone keypads. They are capable of performing a number of telephone and home terminal functions. Examples of such screen phones are shown in the following U.S. Patents:

Anderson et al, U.S. Pat. No. 4,291,198 TITLE: "GENERAL PURPOSE ELECTRONIC TELEPHONE STATION SET"

U.S. Pat. No. 4,533,791 TITLE: "INPUT/OUTPUT DEVICE ARRANGEMENTS FOR TERMINALS"

U.S. Pat. No. 5,008,927 TITLE: "COMPUTER AND TELEPHONE APPARATUS WITH USER FRIENDLY COMPUTER INTERFACE INTEGRITY FEATURES"

Lawlor et al. U.S. Pat. No. 5,220,501 TITLE: "METHOD AND SYSTEM FOR REMOTE DELIVERY OF RETAIL BANKING SERVICES"

While each of these patents shows the combination of an alphanumeric keyboard and a telephone keypad in a subscriber telephone, none of them provides a truly user friendly, reliable and simple integration of both types of key-in units in a single instrument.

OBJECTS OF THE INVENTION

It is the principal object of this invention to provide an smart telephone apparatus which includes an improved combination of telephone keypad and alphanumeric keyboard.

FEATURES AND ADVANTAGES OF THIS INVENTION

In broad terms this invention features a microprocessor-based telephone apparatus comprising a housing, a lower key panel positioned within a top portion of the housing, and an upper key panel hingedly mounted to the housing to swing away and reveal the lower key panel. The lower key panel carries an alphanumeric keyboard thereon to enable a user to perform alphanumeric data entry. The upper key panel carries a telephone keypad to enable a user to dial telephone numbers.

One embodiment of such apparatus further includes means for detecting whether the upper key panel is in a closed position covering the lower key panel. In this embodiment, the telephone keypad carried on the upper key panel has individual keys mounted in positions to actuate a prearranged associated key of the alphanumeric keyboard carried on the lower key panel. In this manner, the alphanumeric keyboard is used for dialing telephone numbers when the upper key panel is closed and is used for alphanumeric data entry when the upper key panel is open.

Preferably, the upper key panel is hingedly mounted to the housing at a forward portion of the housing and a forward portion of the upper key panel so that the upper key panel swings upwardly and forwardly away from the lower key panel.

In a preferred embodiment, a hinge means is provided for hingedly mounting the upper key panel to the housing, and the telephone keypad includes an array of keys, circuit means for registering individual key presses, and cable means connected at one end thereof to the circuit means and extending through the hinge means into the housing.

The preferred embodiment of this invention also incorporates handset mounting wells defined in a top wall portion of the housing at a position to the left side of the upper key panel, an alphanumeric display mounted in a top wall portion of the housing at a position to the rear of the upper key panel, and a magnetic stripe card reader mounted in a top wall portion of the housing intermediate the upper key panel and the alphanumeric display, including a card slot extending parallel to front and rear walls of the housing with a card insert portion of the card slot formed at a position to the right of the the handset mounting wells and a card exit portion of the card slot formed in a right sidewall of the housing and a card read station formed intermediate the card insert portion and card exit portion.

Another aspect of this invention features a microprocessor-based telephone apparatus capable of performing transaction terminal functions and comprising a housing forming an enclosure, a microprocessor system mounted on a circuit board within the enclosure, a display screen interfaced to the microprocessor system, display screen function keys interfaced to the microprocessor system, a magnetic stripe card reader interfaced to the microprocessor system, a telephone keypad interfaced to the microprocessor system, and an alphanumeric keyboard interfaced to the microprocessor system. The microprocessor and interface circuitry are carried on a circuit board mounted within the housing. A lower key panel mounted to the housing carries the alphanumeric keyboard. An upper key panel hingedly mounted to the housing and carrying the telephone keypad between a panel closed position in which the telephone keypad overlies and covers the alphanumeric keyboard and a panel open position in which the alphanumeric keyboard is uncovered.

The smart telephone apparatus of this invention has the advantage that the alphanumeric keyboard is hidden from view when the system in in operation as a smart telephone instrument with only the function keys needed for operating the smart telephone apparatus features. Yet the alphanumeric keyboard is readily accessible by swinging the telephone keypad away from the phone housing when needed to enter alphanumeric data during a phone programming session or a host interactive transaction session. The swing open arrangement is more reliable than a slide in-out arrangement of keyboards. The upper key panel protects the alphanumeric keyboard on the lower key panel when closed. The back surface of the upper key panel in the preferred embodiment serves as a palm rest when opened to expose the alphanumeric keyboard. The overlying keyboard arrangement provides good packing density for the components and reduces the size of the smart telephone apparatus.

BRIEF DESCRIPTION OF DRAWING FIGURES

FIG. 5 is perspective view of an alternative embodiment of smart telephone apparatus in accordance with this invention showing the upper key panel in a closed position.

FIG. 6 is a perspective view of the smart telephone apparatus of FIG. 5 showing the upper key panel in an open position to expose an alphanumeric keyboard.

DESCRIPTION OF INVENTION EMBODIMENTS

A Preferred Embodiment (FIGS. 1–4)

Figure 1:
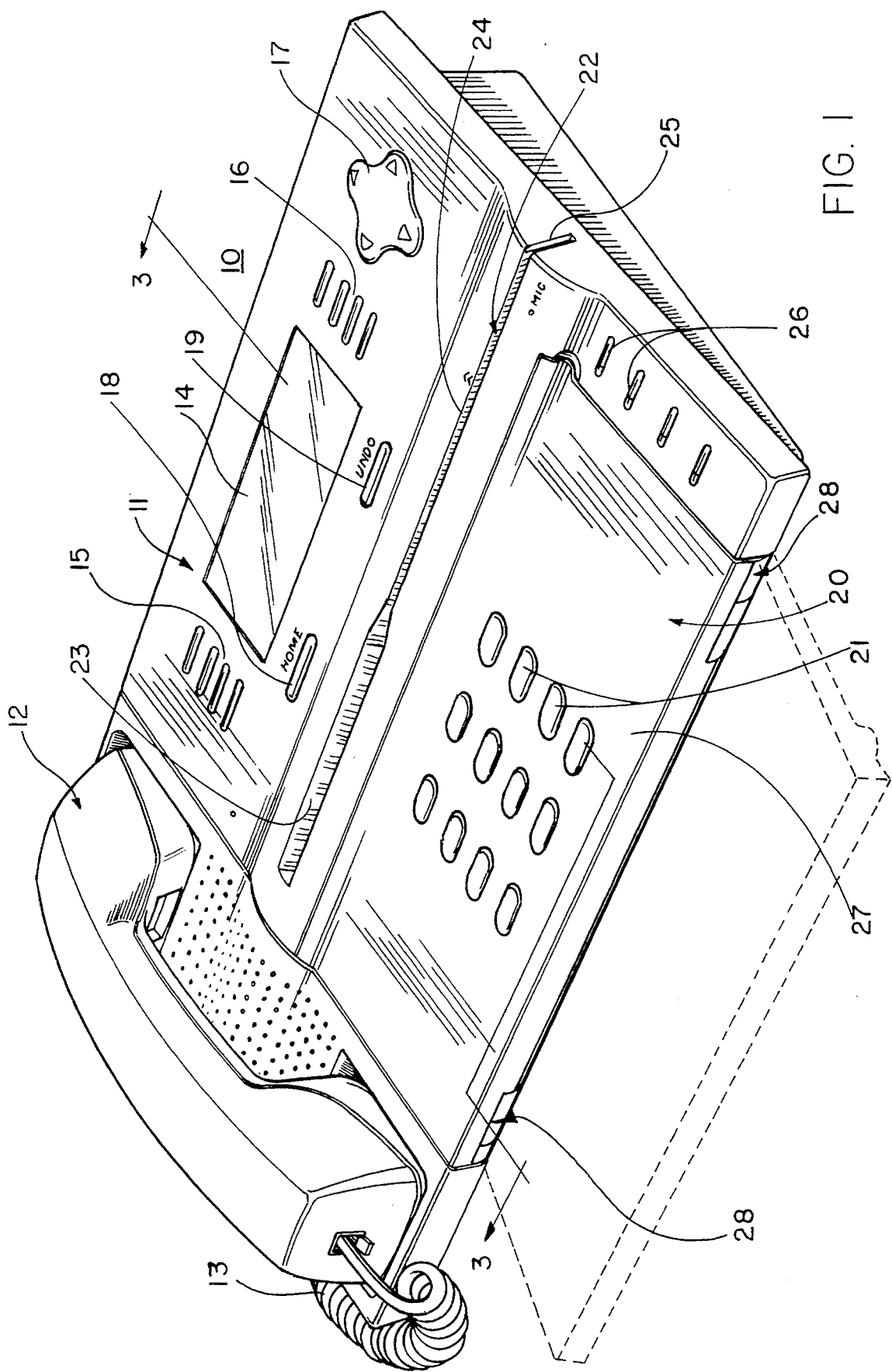
FIG. 1 is a perspective view of one embodiment of smart telephone apparatus in accordance with this invention showing the upper key panel carrying a telephone keypad in a closed position in solid lines and open position in dashed lines.
Figure 2:
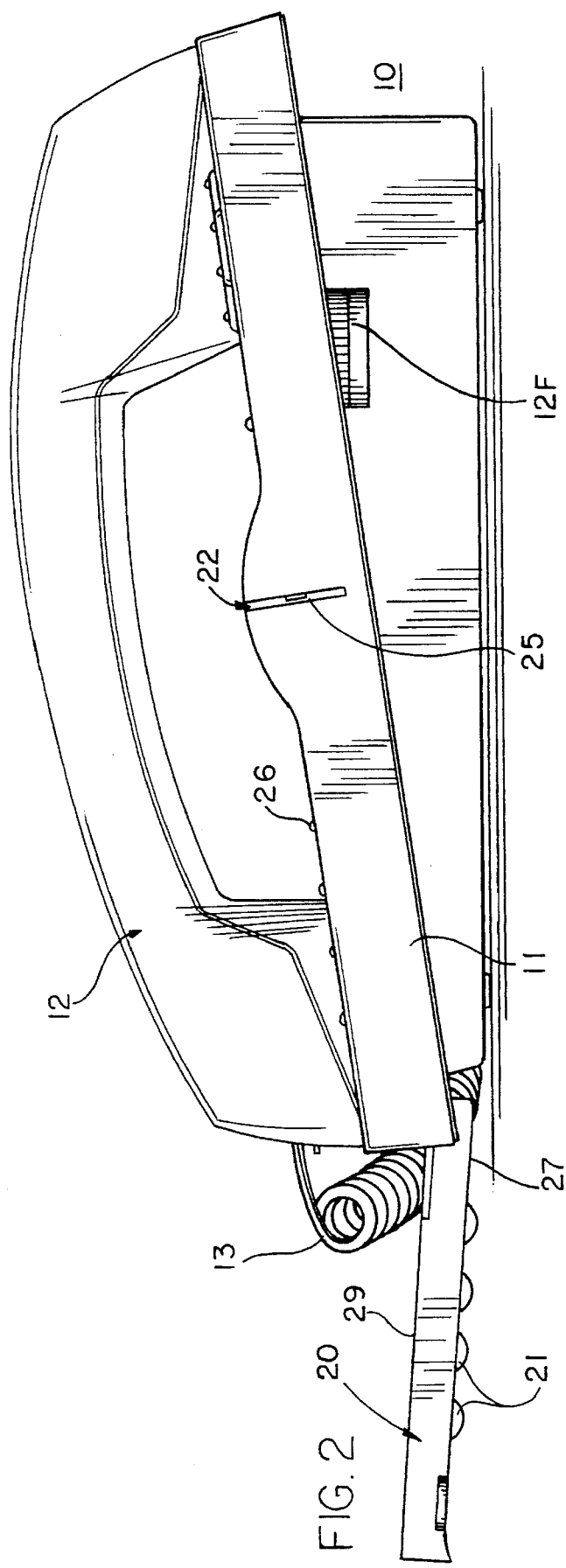
FIG. 2 is a right side elevation view of the smart telephone apparatus of FIG. 1 showing the upper key panel in an open position.
Figure 3:
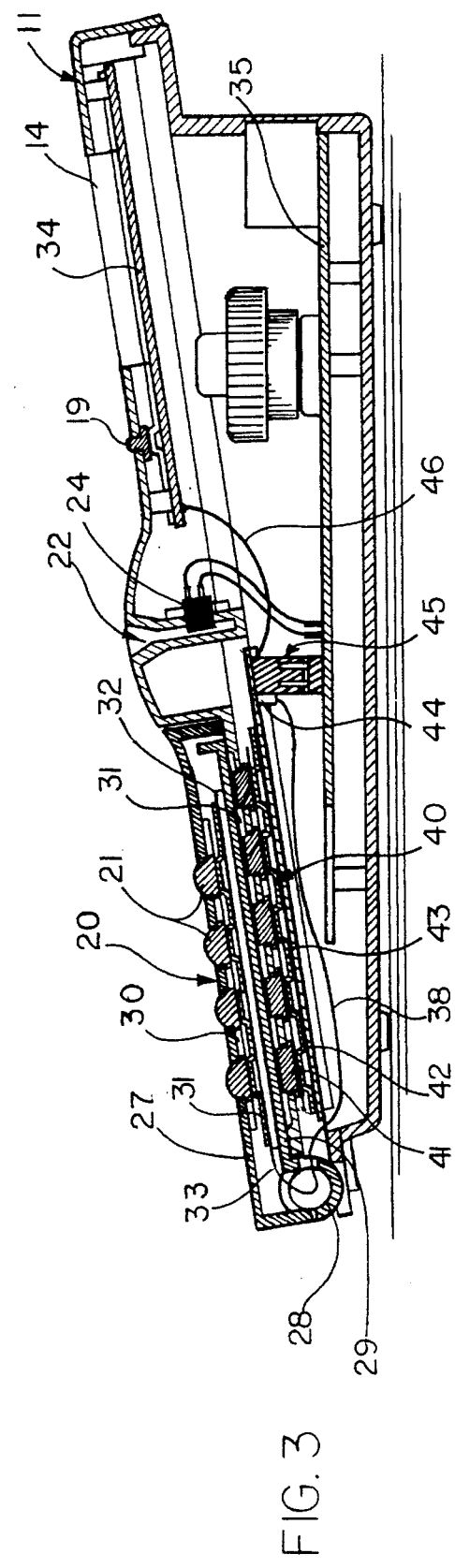
FIG. 3 is a sectioned elevation view of the smart telephone apparatus of FIG. 1 taken along the lines 3—3 in FIG. 1 and showing the structure of overlying alphanumeric keyboard and telephone keypad.
Figure 4:
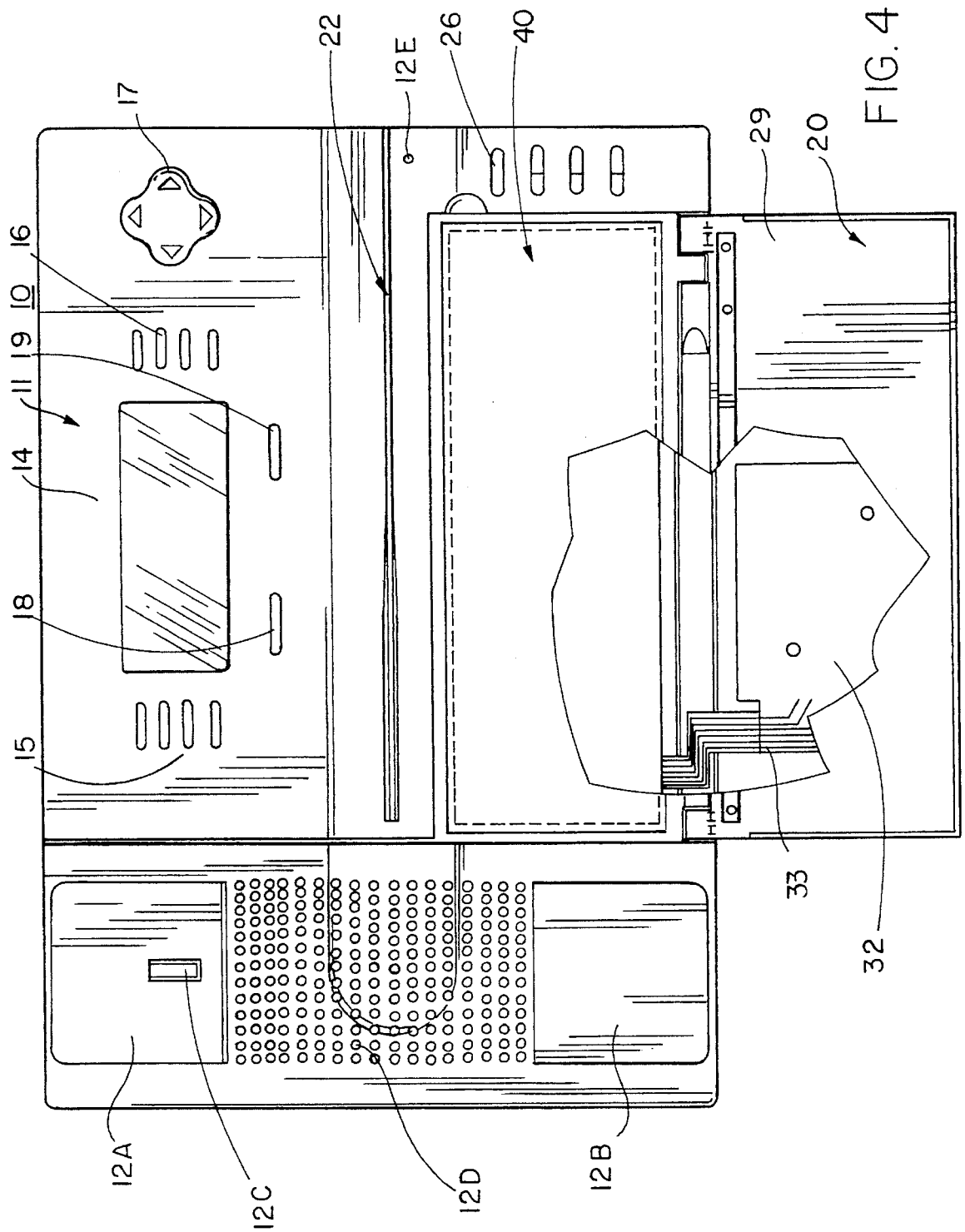
FIG. 4 is a top view of the smart telephone apparatus of FIG. 1 showing the upper key panel open and having a portion cut away to show the ribbon cable connection of the telephone keypad circuit foil through the hinge into the telephone housing.

FIGS. 1–4 show a preferred embodiment of a smart telephone apparatus 10 in which housing 11 has a lower key panel 40, best seen in FIGS. 3 and 4, positioned within a recessed top portion of housing 11 and an upper key panel 20 which is hingedly mounted to housing 11 by a hinge means 28 located at a forward position on both housing 11 and upper key panel 20. Upper key panel 20 swings on hinge means 28 upwardly and forwardly away from lower key panel 40 to reveal it for use. Bottom surface 29 of upper key panel 20 becomes a palm rest in this position.

Lower key panel 40 carries an alphanumeric keyboard thereon for a user to perform alphanumeric data entry into smart telephone apparatus 10. Upper key panel 20 carries a telephone keypad thereon for a user to dial telephone numbers.

Smart telephone apparatus 10 also has an alphanumeric display 14 which is preferably an LCD unit providing at least four lines of at least 20 characters each. On either side of alphanumeric display 14 are two sets 15, 16 of soft function keys aligned with the lines of the display. Two additional function keys 18, 19 are carried on housing 11 under alphanumeric display 14. A four way scroll key arrangement 17 is provided next to the set 16 of function keys.

Between upper key panel 20 and alphanumeric display 14 is a card reader 22 for reading a magnetic data stripe on a data card such as a VISA card or a bank ATM card. Card reader 22 has a card entry slot portion 23, a reading station 24 with a magnetic card reader head mounted thereat, and a card exit slot portion 25. A user can insert a data card at slot portion 23 and then manually swipe the card past reading station 24. This card reader arrangement enables smart telephone apparatus 10 to function as a private transaction terminal in a person's home or office. Smart telephone apparatus 10 may for example be applied to home ordering such as disclosed in Gorog U.S. Pat. No. 4,947,028, entitled "AUTOMATED ORDER AND PAYMENT SYSTEM." Other home terminal applications may also be implemented using the smart telephone apparatus 10 of this invention.

Smart telephone apparatus 10 has a handset 12 connected to housing 11 via a cordset 13. A set of telephone function keys 26 is provided to the right side of upper key panel 20. These keys may be used to invoke telephone functions such as "MUTE" or "HOLD" or "FLASH" or to turn the speakerphone on and off. If a speakerphone feature is provided, a microphone and speaker are provided within housing 11. As shown in FIG. 4, handset 12 rests in respective receiver and transmitter mounting wells 12A and 12B in housing 11. A speakerphone speaker 12D is mounted between these two mounting wells and a speakerphone microphone 12E is mounted on the right side of housing 11. A volume control knob 12F is shown in FIG. 2 on the right side of housing 11.

FIG. 3 illustrates details of one form of structure for a telephone keypad on upper key panel 20 and a alphanumeric keyboard on lower key panel 40. A set of twelve key buttons 21 are positioned within apertures in a top panel surface 27. These keys are carried on a key support frame 30 with individual keys supported by thin resilient arms connecting the key structures. Any other form of key structure can be used. The rest of the telephone keypad structure comprises a membrane 31 with resilient deformable bumps positioned under each key. Membrane 31 overlies a key contact array on a circuit board 32. This type of key structure is quite well known in the art and need not be described in more detail herein.

A ribbon cable portion 33, which is preferably an extension of a flexible circuit pattern providing the key contact array, extends through hinge member 28 to the interior of housing 11 to connect to a terminal structure 44 carried on a circuit board 43 associated with the alphanumeric keyboard structure on lower key panel 40. The alphanumeric keyboard structure comprises a standard arrangement of individual keys 41 carried in apertures in a top panel surface 39, a bumped membrane 42 and a circuit board 43 carrying the key contact array and x-y matrix signal connections between individual key contacts in the array. Function keys 15, 16, 18, 19, and 26 have similar structures and are all connected by cabling (e.g. cable 46) to circuit board 43 for interfacing through a multipin connector 45 to a circuit board 35 which carries a microprocessor based computer system.

An Alternative Embodiment (FIGS. 5–8)

FIGS. 5–8 show an alternative embodiment of smart telephone apparatus 110 in which housing 111 has a lower key panel 140 positioned within a recessed top portion of housing 111 and an upper key panel 120 which is hingedly mounted to housing 111 by a hinge means 128 located at a rearward position on both housing 111 and upper key panel 120. Upper key panel 120 swings on hinge means 128 upwardly and rearwardly away from lower key panel 140 to reveal the alphanumeric keyboard on lower key panel 140 for alphanumeric data entry.

Lower key panel 140 carries an alphanumeric keyboard thereon alphanumeric display 114 upper key panel 120 a telephone keypad. An alphanumeric display 114 has functions key sets 115 and 116 arrayed next to it. A scroll key arrangement 117 is provided next to key set 116. Telephone function keys 126 are positioned on housing 111 forward of upper key panel 120. A magstripe card reader 124 is positioned on housing 111 forward of upper key panel 120 and has card entry portion 123, card reading station 124 and card exit portion 125.

Figure 8:
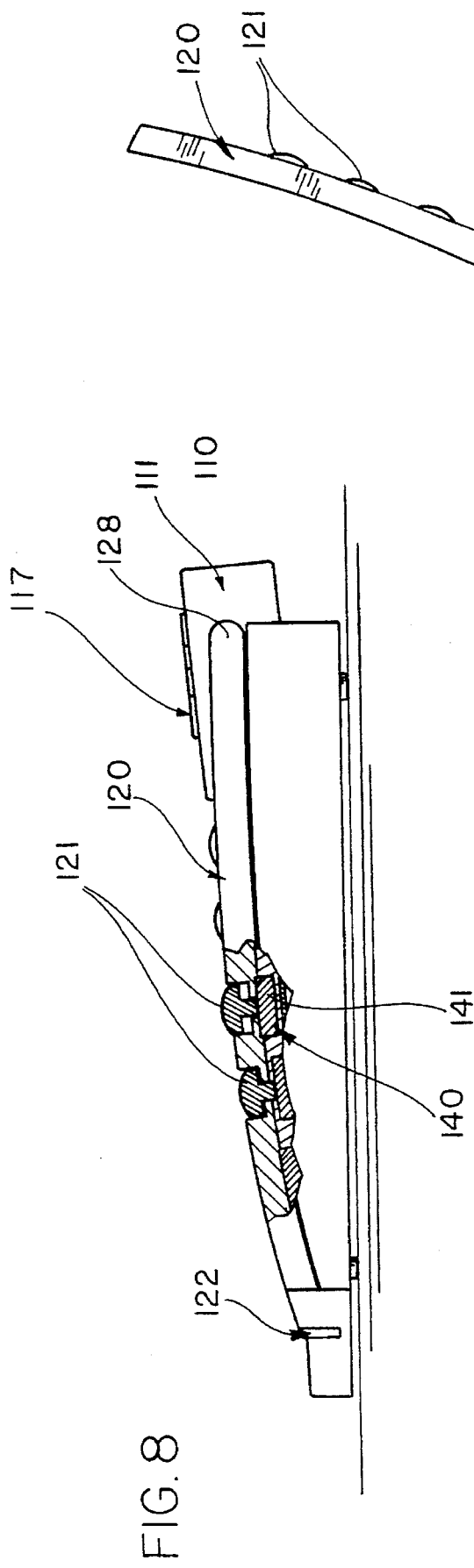
FIG. 8 is a partially sectioned right side elevation view of the smart telephone apparatus of FIG. 5 showing the upper key panel in a closed position and an arrangement in which the keys of the telephone keypad operate keys in the alphanumeric keyboard when depressed.
Figure 7:
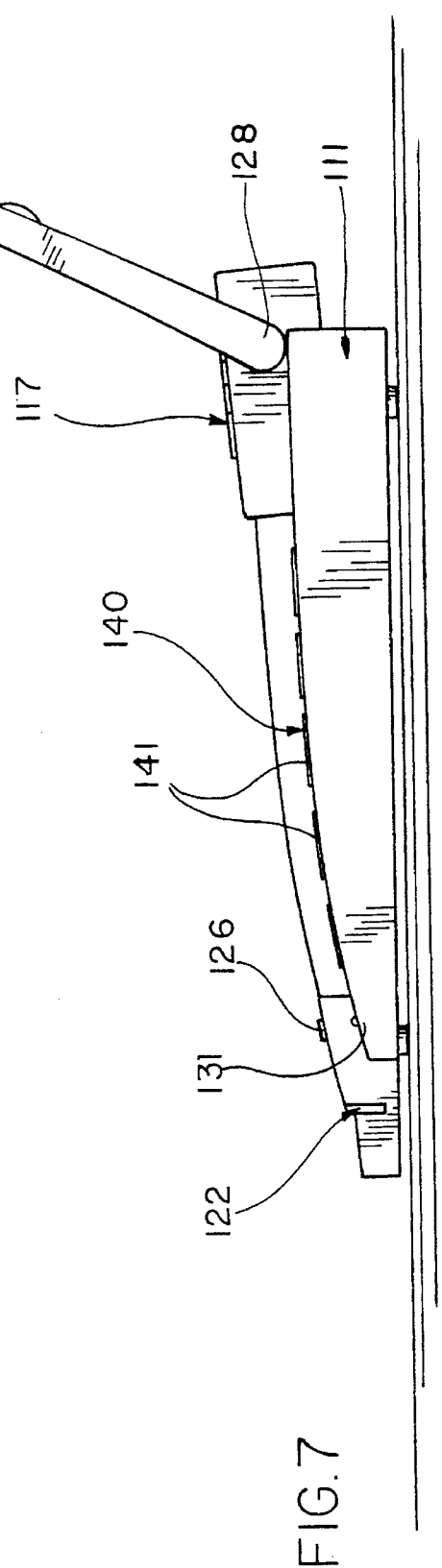
FIG. 7 is a right side elevation view of the smart telephone apparatus of FIG. 5 showing the upper key panel in a open position.

The structures of the telephone keypad on upper key panel 120 and the alphanumeric keyboard on lower key panel 140 may be the same as in the preferred embodiment. Alternatively, as shown in FIG. 8, the individual keys 121 in the telephone keypad may extend through the upper key panel 120 to operate associated keys 141 in the alphanumeric keyboard on lower key panel 140. A microswitch 131 is provided to signal the microprocessor system whether the upper key panel 120 is open or closed so that key presses of the alphanumeric keyboard can be interpreted correctly.

Electronics Supporting the Invention Embodiments

Figure 9:
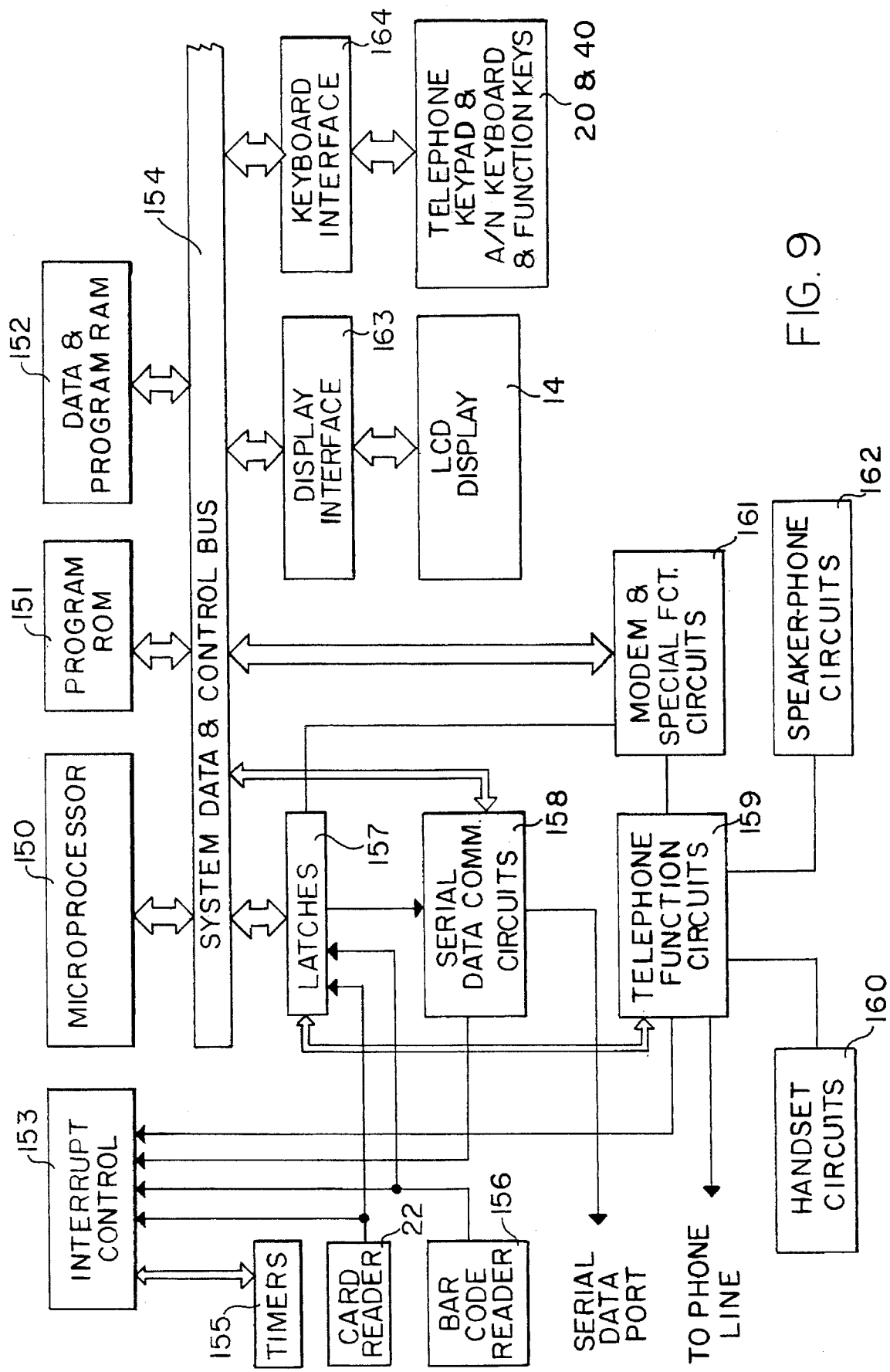
FIG. 9 is a block schematic diagram of electronic circuitry which may be employed in a smart telephone apparatus in accordance with this invention.

While not specifically a part of this invention, the microprocessor system of FIG. 9 is typical of the electronics that support the smart telephone features of this invention. Many forms of microprocessor systems could be used. Microprocessor 150 operates in conjunction with program ROM 151 and data and program RAM 152 to provide the basic operational control of the system. These modules communicate via command and data pathways on a system bus 154 with LCD display 14 (114), telephone keypad and alphanumeric keyboard and function keys 20 and 40, modem 161, serial data communication circuits 158, card reader 22, bar code reader 156, telephone functions circuits (hold, line sense, etc.) 159, via data latches and other interfaces 157, 163, 164, etc. Interrupt control 153 is fed by a set of timers 155 and by inputs from card reader 22, etc. to signal the microprocessor system that these modules need servicing by system routines. The microprocessor system shown is based on Motorola 68EC00 architecture and the associated published specs and data books on that architecture provide details on implementation.

The above description of several invention embodiments are set forth as examples of the principles of this invention and it should be understood that numerous changes could be made by persons skilled in this art without departing from the principles and scope of the invention as claimed in the following claims.

What is claimed is:

1. A microprocessor-based telephone apparatus comprising:

a housing, a display screen mounted in said housing, a lower key panel carried in a fixed position within a top portion of said housing separated from said display screen, and an upper key panel overlying said lower key panel while in a first position thereof and being hingedly mounted to said housing in a manner so as to swing away from said first position to a second position thereof and thereby to provide access to said lower key panel without obscuring said display screen;

said lower key panel carrying an alphanumeric keyboard on a top surface thereof to enable a user to perform alphanumeric data entry after swinging away said upper key panel to said second position thereof; and said upper key panel carrying a telephone keypad to enable a user to dial telephone numbers when said upper key panel is in said first position overlying said lower key panel, whereby only said telephone keypad carried on said upper key panel is accessible for operation by a user when said upper key panel is in said first position thereof and only said alphanumeric keyboard is accessible for operation by a user when said upper key panel is in said second position thereof.

2. Telephone apparatus as claimed in claim 1, further comprising means for detecting whether said upper key panel is in a closed position covering said lower key panel, said telephone keypad carried on said upper key panel having individual keys mounted in positions to actuate a prearranged associated key of said alphanumeric keyboard carried on said lower key panel, whereby said alphanumeric keyboard is used for dialing telephone numbers when said upper key panel is closed and is used for alphanumeric data entry when said upper key panel is open.

3. Telephone apparatus as claimed in claim 1, wherein said upper key panel is hingedly mounted to said housing at a rear portion of said housing and a rear portion of said upper key panel so that said upper key panel swings upwardly and rearwardly away from said lower key panel.

4. Telephone apparatus as claimed in claim 1, wherein said upper key panel is hingedly mounted to said housing at a forward portion of said housing and a forward portion of said upper key panel so that said upper key panel swings upwardly and forwardly away from said lower key panel.

5. Telephone apparatus as claimed in claim 1, wherein hinge means is provided for hingedly mounting said upper key panel to said housing, said telephone keypad includes
 an array of keys,
 circuit means for registering individual key presses, and
 cable means connected at one end thereof to said circuit means and extending through said hinge means into said housing.

6. Telephone apparatus as claimed in claim 4, further comprising handset mounting wells defined in a top wall portion of said housing at a position to the left side of said upper key panel, an alphanumeric display mounted in a top wall portion of said housing at a position to the rear of said upper key panel, and a magnetic stripe card reader mounted in a top wall portion of said housing intermediate said upper key panel and said alphanumeric display, including a card slot extending parallel to front and rear walls of said housing with a card insert portion of said card slot formed at a position to the right of said said handset mounting wells and a card exit portion of said card slot formed in a right sidewall of said housing and a card read station formed intermediate said card insert portion and card exit portion.

7. A microprocessor-based telephone apparatus capable of performing transaction terminal functions and comprising a housing forming an enclosure, a microprocessor system carried on a circuit board mounted within said enclosure, a display screen carried on said housing and interfaced to said microprocessor system, display screen function keys carried on said housing and interfaced to said microprocessor system, a magnetic stripe card reader carried on said housing and interfaced to said microprocessor system, a telephone keypad interfaced to said microprocessor system, and an alphanumeric keyboard interfaced to said microprocessor system, a lower key panel mounted in a fixed position within a top portion of said housing and carrying said alphanumeric keyboard, an upper key panel hingedly mounted to said housing and carrying said telephone keypad between a panel closed position in which said telephone keypad overlies and covers said alphanumeric keyboard and a panel open position in which said telephone keypad swings away without obscuring said display screen to reveal said alphanumeric keyboard whereby only one of said telephone keypad and said alphanumeric keyboard are accessable to a user at any particular time, depending on the position of said upper key panel, said telephone keypad being accessible to a user only when said said upper key panel is in said panel closed position, said alphanumeric keyboard being accessible to a user only when said upper key panel is in said panel open position.

8. Telephone apparatus as claimed in claim 7, further comprising means for detecting whether said upper key panel is in a closed position covering said lower key panel, and wherein said telephone keypad carried on said upper key panel has individual keys mounted in positions to actuate a prearranged associated key of said alphanumeric keyboard carried on said lower key panel, whereby said alphanumeric keyboard is used for dialing telephone numbers when said upper key panel is closed and is used for alphanumeric data entry when said upper key panel is open.

9. Telephone apparatus as claimed in claim 7, wherein said upper key panel is hingedly mounted to said housing at a rear portion of said housing and a rear portion of said upper key panel so that said upper key panel swings upwardly and rearwardly away from said lower key panel.

10. Telephone apparatus as claimed in claim 7, wherein said upper key panel is hingedly mounted to said housing at a forward portion of said housing and a forward portion of said upper key panel so that said upper key panel swings upwardly and forwardly away from said lower key panel.

11. Telephone apparatus as claimed in claim 7, wherein hinge means is provided for hingedly mounting said upper key panel to said housing, said telephone keypad includes
 an array of keys,
 circuit means for registering individual key presses, and
 cable means connected at one end thereof to said circuit means and extending through said hinge means into said enclosure and connecting to said circuit board carrying said microprocessor system.

12. Telephone apparatus as claimed in claim 10, wherein said display screen comprises an alphanumeric display and said alphanumeric display is mounted in a top wall portion of said housing at a position to the rear of and spaced from said upper key panel, and said magnetic stripe card reader is mounted in a top wall portion of said housing intermediate said upper key panel and said alphanumeric display, including a card slot extending parallel to front and rear walls of said housing with a card insert portion of said card slot formed at a position to the right of said said handset mounting wells and a card exit portion of said card slot formed in a right sidewall of said housing and a card read station formed intermediate said card insert portion and card exit portion.

13. Telephone apparatus as claimed in claim 7, wherein said housing has a major top wall surface forming a portion of said enclosure, said lower key panel being mounted in a recessed portion of said enclosure at a forward thereof with said alphanumeric keyboard having top key surfaces recessed below said major top wall surface of said housing;

said upper key panel comprising a separate enclosure with top, bottom and side walls and being mounted to said housing by hinge means at a front wall of said housing to swing between a closed position covering said lower key panel and an open position exposing said lower key panel, said top wall of said upper key panel being flush with said major top wall surface of said housing in said closed position and said upper key panel swinging upward and forward to lie forward of said housing in said open position.

14. Telephone apparatus as claimed in claim 13, wherein said telephone keypad includes an array of keys having top surfaces extending through apertures in said top surface of said upper key panel, circuit board means carried within said separate enclosure for registering key presses, and cable means formed integral with said circuit board means and extending through said hinge means to connect said circuit board means to said circuit board within said housing.

15. Telephone apparatus as claimed in claim 14, wherein said display screen comprises an alphanumeric display and said alphanumeric display is mounted in said top wall portion of said housing at a position to the rear of and spaced from said upper key panel, and said magnetic stripe card reader is mounted in a top wall portion of said housing intermediate and spaced from both said upper key panel and said alphanumeric display, and includes a card slot extending parallel to front and rear walls of said housing with a card insert portion of said card slot formed at a position to the right of said said handset mounting wells and a card exit portion of said card slot formed in a right sidewall of said housing and a card read station formed intermediate said card insert portion and card exit portion.

* * * * *